(12) United States Patent
Harlan

(10) Patent No.: US 6,569,003 B1
(45) Date of Patent: May 27, 2003

(54) COOLANT APPARATUS FOR A CHAINSAW SHARPENER

(76) Inventor: Michael D. Harlan, 12514 Hickory Ave., Victorville, CA (US) 92392

( * ) Notice: Subject to any disclaimer, the term of this patent is extended or adjusted under 35 U.S.C. 154(b) by 17 days.

(21) Appl. No.: 09/917,164

(22) Filed: Jul. 27, 2001

(51) Int. Cl.⁷ ............................................... B24B 55/02
(52) U.S. Cl. ........................ 451/449; 451/450; 451/184
(58) Field of Search .................................. 451/349, 361, 451/419, 449, 450, 178, 184, 183

(56) References Cited

U.S. PATENT DOCUMENTS

| | | | |
|---|---|---|---|
| 2,426,817 A | * | 9/1947 | Charlton et al. |
| 2,434,679 A | * | 1/1948 | Wagner et al. |
| 2,455,113 A | * | 11/1948 | Coates |
| 3,334,451 A | * | 8/1967 | Hutton |
| 3,592,085 A | | 7/1971 | Arneson |
| 3,600,859 A | | 8/1971 | Edgecomb |
| 3,759,449 A | | 9/1973 | Ruthman et al. |
| 4,319,502 A | | 3/1982 | Smith |
| 4,388,780 A | | 6/1983 | Rees |
| 4,622,780 A | * | 11/1986 | Tingley |
| D288,768 S | | 3/1987 | Karden et al. |
| 5,414,963 A | * | 5/1995 | Watanabe et al. ............... 451/72 |
| 6,206,760 B1 | * | 3/2001 | Chang et al. .................. 451/41 |
| 6,439,218 B1 | * | 8/2002 | Hulett ..................... 125/13.01 |

* cited by examiner

Primary Examiner—Eileen P. Morgan

(57) ABSTRACT

A coolant apparatus for a chainsaw sharpener for improving the performance of a chainsaw sharpening tool. The coolant apparatus for a chainsaw sharpener includes a coolant support structure including a ledge, an upper back wall, a lower back wall, a bottom wall, side walls, a front wall, and a trough; and also includes a pump member being securely attached to the coolant support structure and being disposed in the trough; and further includes a flexible tubular member being connected to the pump member; and also includes a valve member being connected to the flexible tubular member; and further includes a jointed flexible tube having a nozzle at an end thereof and being connected to the valve member for directing coolant to a chain cutter-tooth being sharpened.

10 Claims, 4 Drawing Sheets

COOLANT APPARATUS FOR A CHAINSAW SHARPENER

BACKGROUND OF THE INVENTION

1. Field of the Invention

The present invention relates to chainsaw sharpener cooling apparatuses and more particularly pertains to a new coolant apparatus for a chainsaw sharpener for improving the performance of a chainsaw sharpening tool.

2. Description of the Prior Art

The use of chainsaw sharpener cooling apparatuses is known in the prior art. More specifically, chainsaw sharpener cooling apparatuses heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,319,502; U.S. Pat. No. 3,600,859; U.S. Pat. No. 3,592,085; U.S. Pat. No. Des. 288,768; U.S. Pat. No. 4,388,780; and U.S. Pat. No. 3,759,449.

While these devices fulfill their respective, particular objectives and requirements, the aforementioned patents do not disclose a new coolant apparatus for a chainsaw sharpener. The inventive device includes a coolant support structure including a ledge, an upper back wall, a lower back wall, a bottom wall, side walls, a front wall, and a trough; and also includes a pump member being securely attached to the coolant support structure and being disposed in the trough; and further includes a flexible tubular member being connected to the pump member; and also includes a valve member being connected to the flexible tubular member; and further includes a jointed flexible tube having a nozzle at an end thereof and being connected to the valve member for directing coolant to a chain cutter-tooth being sharpened.

In these respects, the coolant apparatus for a chainsaw sharpener according to the present invention substantially departs from the conventional concepts and designs of the prior art, and in so doing provides an apparatus primarily developed for the purpose of improving the performance of a chainsaw sharpening tool.

SUMMARY OF THE INVENTION

In view of the foregoing disadvantages inherent in the known types of chainsaw sharpener cooling apparatuses now present in the prior art, the present invention provides a new coolant apparatus for a chainsaw sharpener construction wherein the same can be utilized for improving the performance of a chainsaw sharpening tool.

The general purpose of the present invention, which will be described subsequently in greater detail, is to provide a new coolant apparatus for a chainsaw sharpener which has many of the advantages of the chainsaw sharpener cooling apparatuses mentioned heretofore and many novel features that result in a new coolant apparatus for a chainsaw sharpener which is not anticipated, rendered obvious, suggested, or even implied by any of the prior art chainsaw sharpener cooling apparatuses, either alone or in any combination thereof.

To attain this, the present invention generally comprises a coolant support structure including a ledge, an upper back wall, a lower back wall, a bottom wall, side walls, a front wall, and a trough; and also includes a pump member being securely attached to the coolant support structure and being disposed in the trough; and further includes a flexible tubular member being connected to the pump member; and also includes a valve member being connected to the flexible tubular member; and further includes a jointed flexible tube having a nozzle at an end thereof and being connected to the valve member for directing coolant to a chain cutter-tooth being sharpened.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new coolant apparatus for a chainsaw sharpener which has many of the advantages of the chainsaw sharpener cooling apparatuses mentioned heretofore and many novel features that result in a new coolant apparatus for a chainsaw sharpener which is not anticipated, rendered obvious, suggested, or even implied by any of the prior art chainsaw sharpener cooling apparatuses, either alone or in any combination thereof.

It is another object of the present invention to provide a new coolant apparatus for a chainsaw sharpener which may be easily and efficiently manufactured and marketed.

It is a further object of the present invention to provide a new coolant apparatus for a chainsaw sharpener which is of a durable and reliable construction.

An even further object of the present invention is to provide a new coolant apparatus for a chainsaw sharpener which is susceptible of a low cost of manufacture with regard to both materials and labor, and which accordingly is then susceptible of low prices of sale to the consuming public, thereby making such coolant apparatus for a chainsaw sharpener economically available to the buying public.

Still yet another object of the present invention is to provide a new coolant apparatus for a chainsaw sharpener which provides in the apparatuses and methods of the prior art some of the advantages thereof, while simultaneously overcoming some of the disadvantages normally associated therewith.

Still another object of the present invention is to provide a new coolant apparatus for a chainsaw sharpener for improving the performance of a chainsaw sharpening tool.

Yet another object of the present invention is to provide a new coolant apparatus for a chainsaw sharpener which includes a coolant support structure including a ledge, an upper back wall, a lower back wall, a bottom wall, side walls, a front wall, and a trough; and also includes a pump member being securely attached to the coolant support structure and being disposed in the trough; and further includes a flexible tubular member being connected to the pump member; and also includes a valve member being connected to the flexible tubular member; and further includes a jointed flexible tube having a nozzle at an end thereof and being connected to the valve member for directing coolant to a chain cutter-tooth being sharpened.

Still yet another object of the present invention is to provide a new coolant apparatus for a chainsaw sharpener that is easy and convenient to set up and use.

Even still another object of the present invention is to provide a new coolant apparatus for a chainsaw sharpener that extends the lifespan of the grinding wheel of the chainsaw sharpener by lubricating it.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
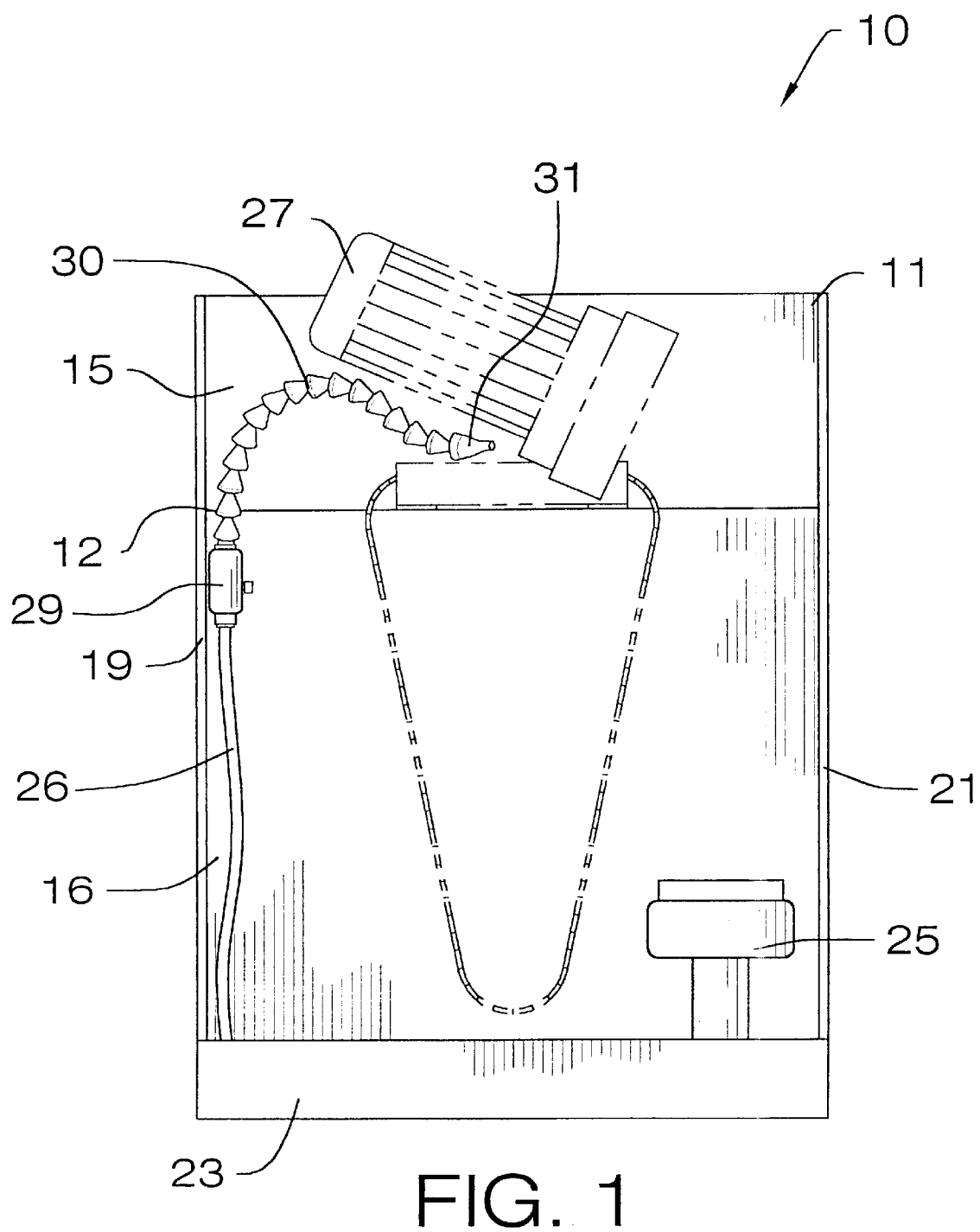
FIG. 1 is a front elevational view of a new coolant apparatus for a chainsaw sharpener according to the present invention.
Figure 2:
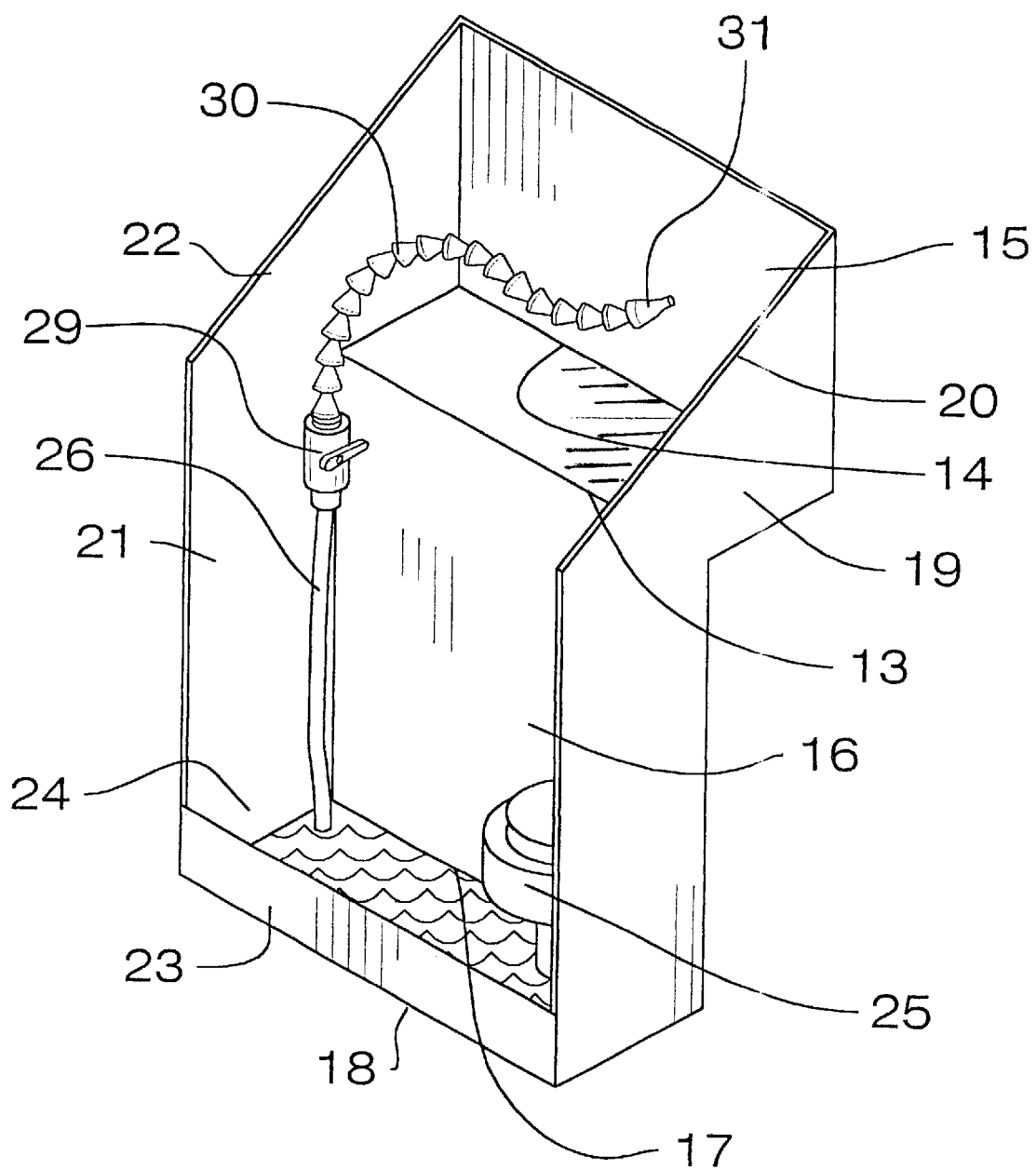
FIG. 2 is a perspective view of the present invention.
Figure 3:
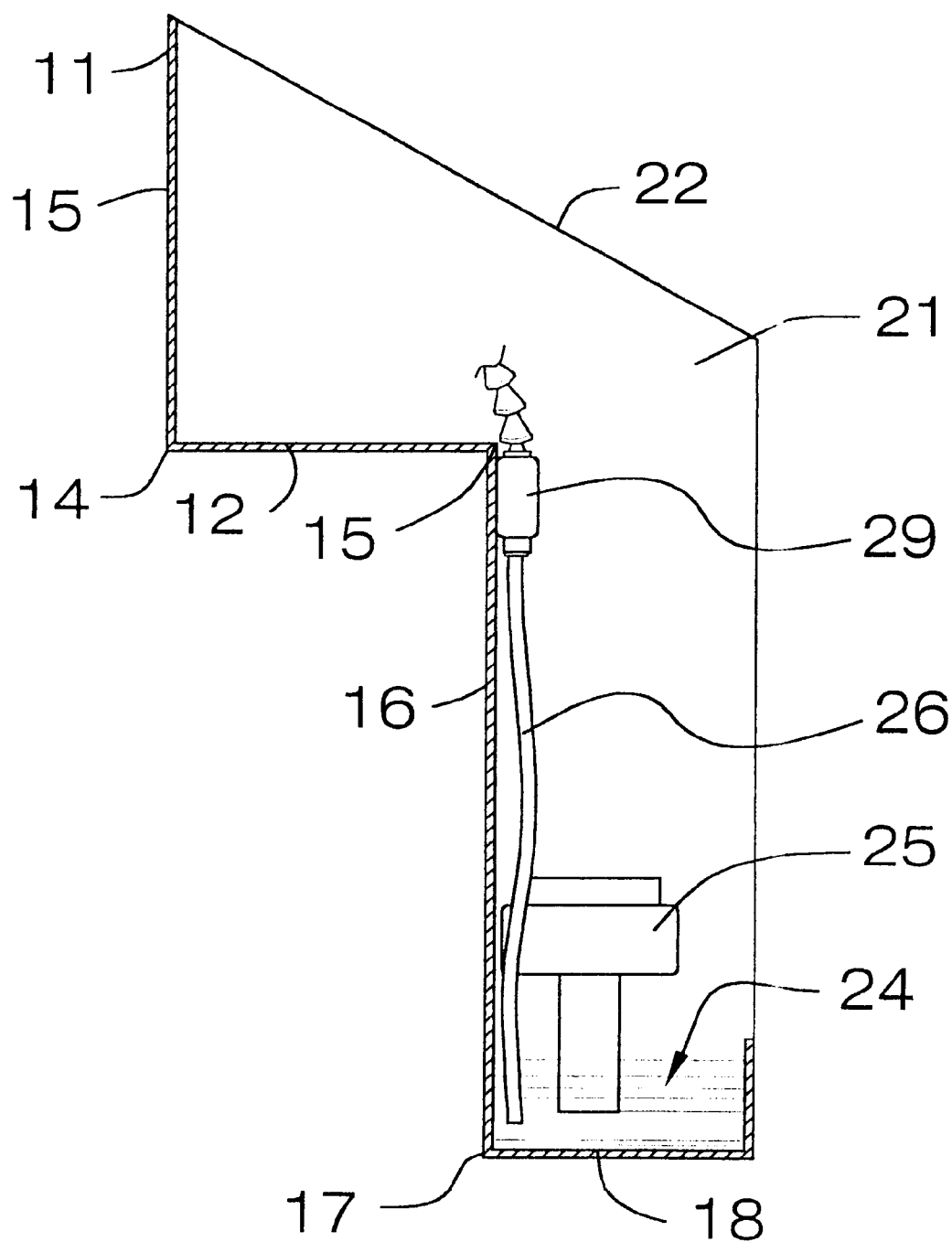
FIG. 3 is a cross-sectional view of the present invention.
Figure 4:
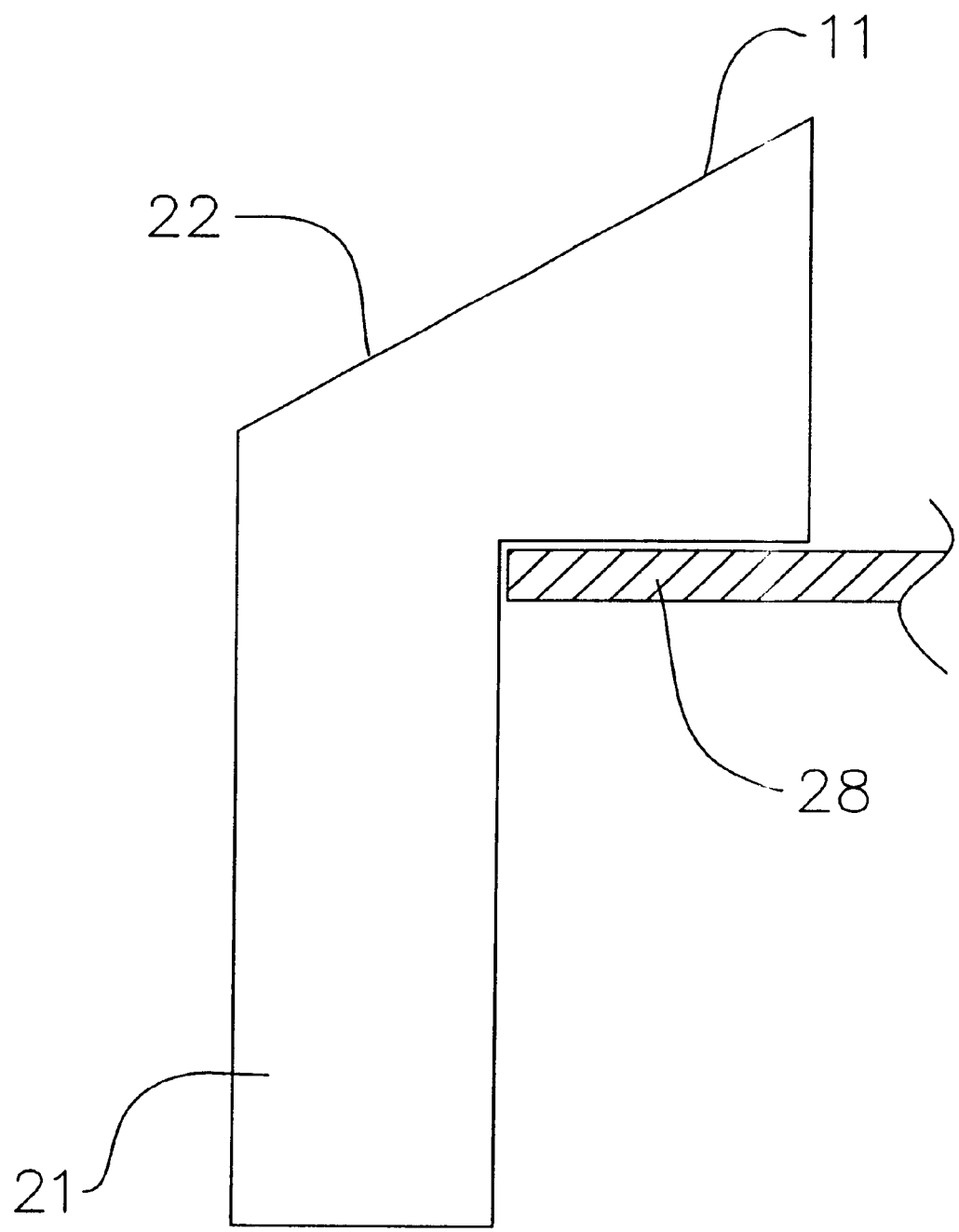
FIG. 4 is a side elevational view of the present invention.

With reference now to the drawings, and in particular to FIGS. 1 through 4 thereof, a new coolant apparatus for a chainsaw sharpener embodying the principles and concepts of the present invention and generally designated by the reference numeral 10 will be described.

As best illustrated in FIGS. 1 through 4, the coolant apparatus for a chainsaw sharpener 10 generally comprises a coolant support structure 10 including a ledge 11, an upper back wall 15, a lower back wall 16, a bottom wall 18, side walls 19,21, a front wall 23, and a trough 24. The ledge 11 has a front edge 13 and a back edge 14. The upper back wall 15 is conventionally attached along the back edge 14 of the ledge 11 and extends upwardly therefrom. The lower back wall 16 is conventionally attached along the front edge 15 of the ledge 11 and extends downwardly therefrom. The bottom wall 18 is conventionally attached to a bottom edge 17 of the lower back wall 16 and extends forwardly therefrom. The front wall 23 is conventionally attached to a front edge of the bottom wall 18 and extends upwardly therefrom. The side walls 19,21 are conventionally attached along side edges of the ledge 11, the upper and lower back walls 15,16, the bottom wall 18, and the front wall 23. The trough 24 is formed by the front and bottom walls 18,23, and by lower portions of the side walls 19,21 and the lower back wall 16 and is adapted to hold coolant liquid such as water. The front wall 23 has a height which is substantially shorter than that of the lower back wall 16. The ledge 11 is adapted to securely rest upon an edge of a work bench 28 below the chainsaw sharpener 27 with upper back wall 15 being a splash guard. Each of the side walls 19,21 has a top edge 20,22 which is slanted downwardly from the upper back wall 15 to a front edge thereof. The front wall 23 has a height of approximately 3 inches. A pump member 25 is securely and conventionally attached to the coolant support structure 11 and is disposed in the trough 24 with the pump member 25 being a sump pump and being conventionally mounted to the lower back wall 16. A flexible tubular member 26 is conventionally connected to the pump member 25. A valve member 29 is conventionally connected to the flexible tubular member 16. A jointed flexible tube 30 having a nozzle 31 at an end thereof is conventionally connected to the valve member 29 for directing coolant to a chain cutter-tooth being sharpened.

In use, the user puts water and water soluble oil in the trough 24 and turns on the pump member 25 which pumps the coolant from the pump member 25 to the chain cutter-tooth through the flexible tubular member 26, the valve member 29 and the jointed flexible tube 30 including the nozzle 31.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A coolant apparatus for a chainsaw sharpener comprising:

a coolant support structure including a ledge, an upper back wall, a lower back wall, a bottom wall, side walls, a front wall, and a trough;

a pump member being securely attached to said coolant support structure and being disposed in said trough;

a flexible tubular member being connected to said pump member;

a valve member being connected to said flexible tubular member;

a jointed flexible tube having a nozzle at an end thereof and being connected to said valve member for directing coolant to a chain cutter-tooth being sharpened;

wherein said ledge has a front edge and a hack edge, said upper back wall being attached along said back edge of said ledge and extending upwardly therefrom, said lower back wall being attached along said front edge of said ledge and extending downwardly therefrom, said bottom wall being attached to a bottom edge of said lower back wall and extending forwardly therefrom, said front wall being attached to a front edge of said bottom wall and extending upwardly therefrom, said side walls being attached along side edges of said ledge, said upper and lower back walls, said bottom wall, and said front wall;

wherein said trough is formed by said front and bottom walls, and by lower portions of said side walls and said lower back wall, and is adapted to hold coolant liquid such as water and water soluble oil;

wherein said front wall has a height which is substantially shorter than that of said lower back wall; and wherein said ledge is adapted to securely rest upon an edge of a work bench below the chainsaw sharpener with said upper back wall being a splash guard.

2. A coolant apparatus for a chainsaw sharpener as described in claim 1, wherein each of said side walls has a top edge which is slanted downwardly from said upper back wall to a front edge thereof.

3. A coolant apparatus for a chainsaw sharpener as described in claim 1, wherein said pump member is a sump pump and is securely mounted to said lower back wall.

4. A coolant apparatus for a chainsaw sharpener comprising:

a coolant support structure including a ledge, an upper back wall, a lower back wall, a bottom wall, side walls, a front wall, and a trough, said ledge having a front edge and a back edge, said upper back wall being attached along said back edge of said ledge and extending upwardly therefrom, said lower back wall being attached along said front edge of said ledge and extending downwardly therefrom, said bottom wall being attached to a bottom edge of said lower back wall and extending forwardly therefrom, said front wall being attached to a front edge of said bottom wall and extending upwardly therefrom, said side walls being attached along side edges of said ledge, said upper and lower back walls, said bottom wall, and said front wall, said trough being formed by said front and bottom walls, and by lower portions of said side walls and said lower back wall, and being adapted to hold coolant liquid such as water and water soluble oil, said front wall having a height which is substantially shorter than that of said lower back wall, said ledge being adapted to securely rest upon an edge of a work bench below the chainsaw sharpener with said upper back wall being a splash guard, each of said side walls having a top edge which is slanted downwardly from said upper back wall to a front edge thereof, said front wall having a height of approximately 3 inches;

a pump member being securely attached to said coolant support structure and being disposed in said trough, said pump member being a sump pump and being mounted to said lower back wall;

a flexible tubular member being connected to said pump member;

a valve member being connected to said flexible tubular member; and a jointed flexible tube having a nozzle at an end thereof and being connected to said valve member for directing coolant to a chain cutter-tooth being sharpened.

5. A coolant support apparatus for a chainsaw sharpener comprising:

a coolant support structure including a ledge, an upper back wall, a lower back wall, a bottom wall, side walls, a front wall, and a trough;

a pump member being securely attached to said coolant support structure and being disposed in said trough;

a flexible tubular member being connected to said pump member;

a valve member being connected to said flexible tubular member;

a jointed flexible tube having a nozzle at an end thereof and being connected to said valve member for directing coolant to a chain cutter-tooth being sharpened; and wherein each of said side walls has a top edge which is slanted downwardly from said upper back wall to a front edge thereof.

6. A coolant apparatus for a chainsaw sharpener as described in claim 5, wherein said ledge has a front edge and a back edge, said upper back wall being attached along said back edge of said ledge and extending upwardly therefrom, said lower back wall being attached along said front edge of said ledge and extending downwardly therefrom, said bottom wall being attached to a bottom edge of said lower back wall and extending forwardly therefrom, said front wall being attached to a front edge of said bottom wall and extending upwardly therefrom, said side walls being attached along side edges of said ledge, said upper aced lower back walls, said bottom wall, and said front wall.

7. A coolant apparatus for a chainsaw sharpener as described in claim 5, wherein said trough is formed by said front and bottom walls, and by lower portions of said side walls and said lower back wall, and is adapted to hold coolant liquid such as water and water soluble oil.

8. A coolant apparatus for a chain saw sharpener as described in claim 5, wherein said front wall has a height which is substantially shorter than that of said lower back wall.

9. A coolant apparatus for a chainsaw sharpener as described in claim 5, wherein said ledge is adapted to securely rest upon an edge of a work bench below the chainsaw sharpener with said upper back wall being a splash guard.

10. A coolant apparatus for a chainsaw sharpener as described in claim 5, wherein said pump member is a sump pump and is securely mounted to said lower back wall.

* * * * *